March 18, 1969  L. B. ADES  3,433,361

COOLANT FILTER COMBINATION

Filed May 31, 1967  Sheet 1 of 3

INVENTOR
LEWIS B. ADES
BY Hofgren, Wegner, Allen, Stellman & McCord
ATTORNEYS.

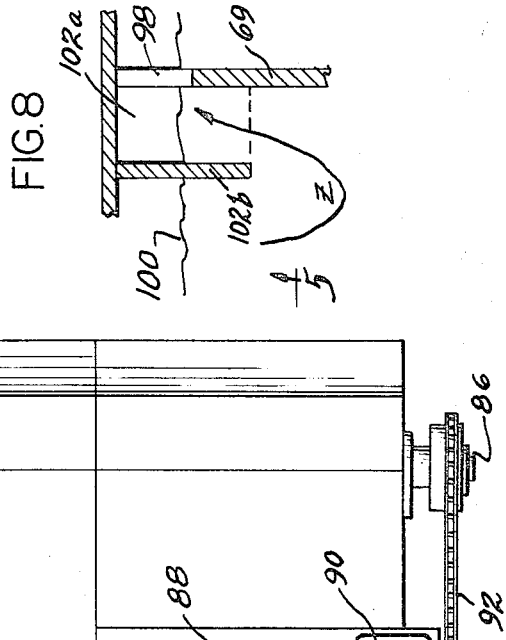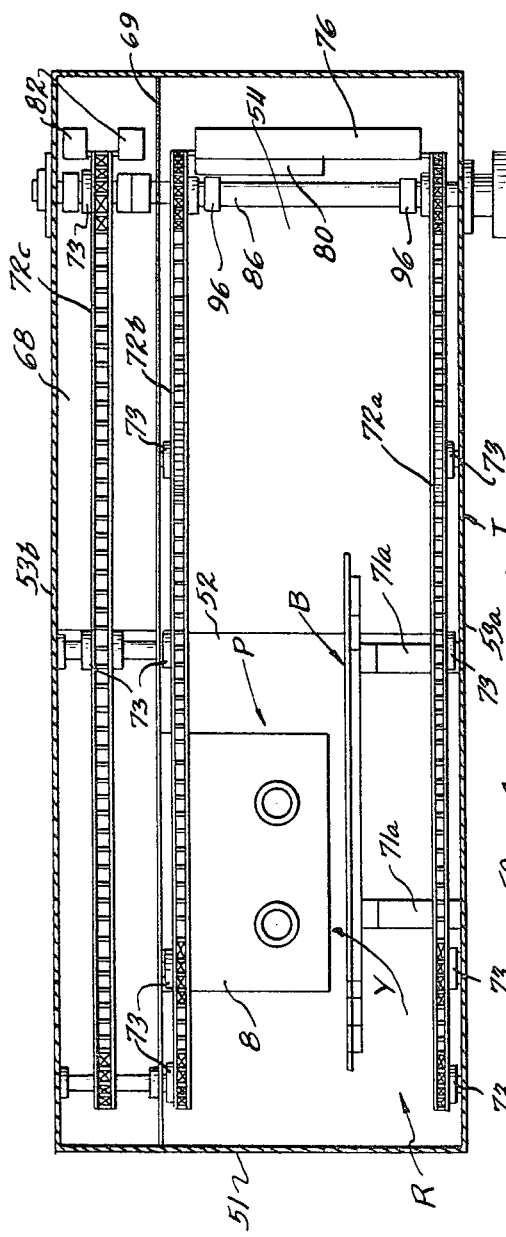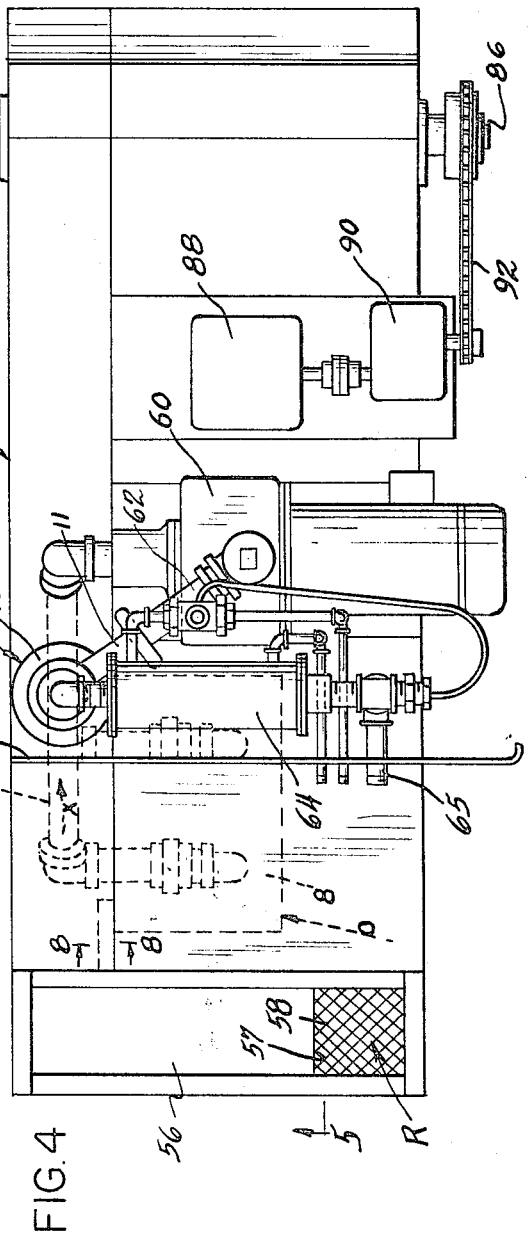

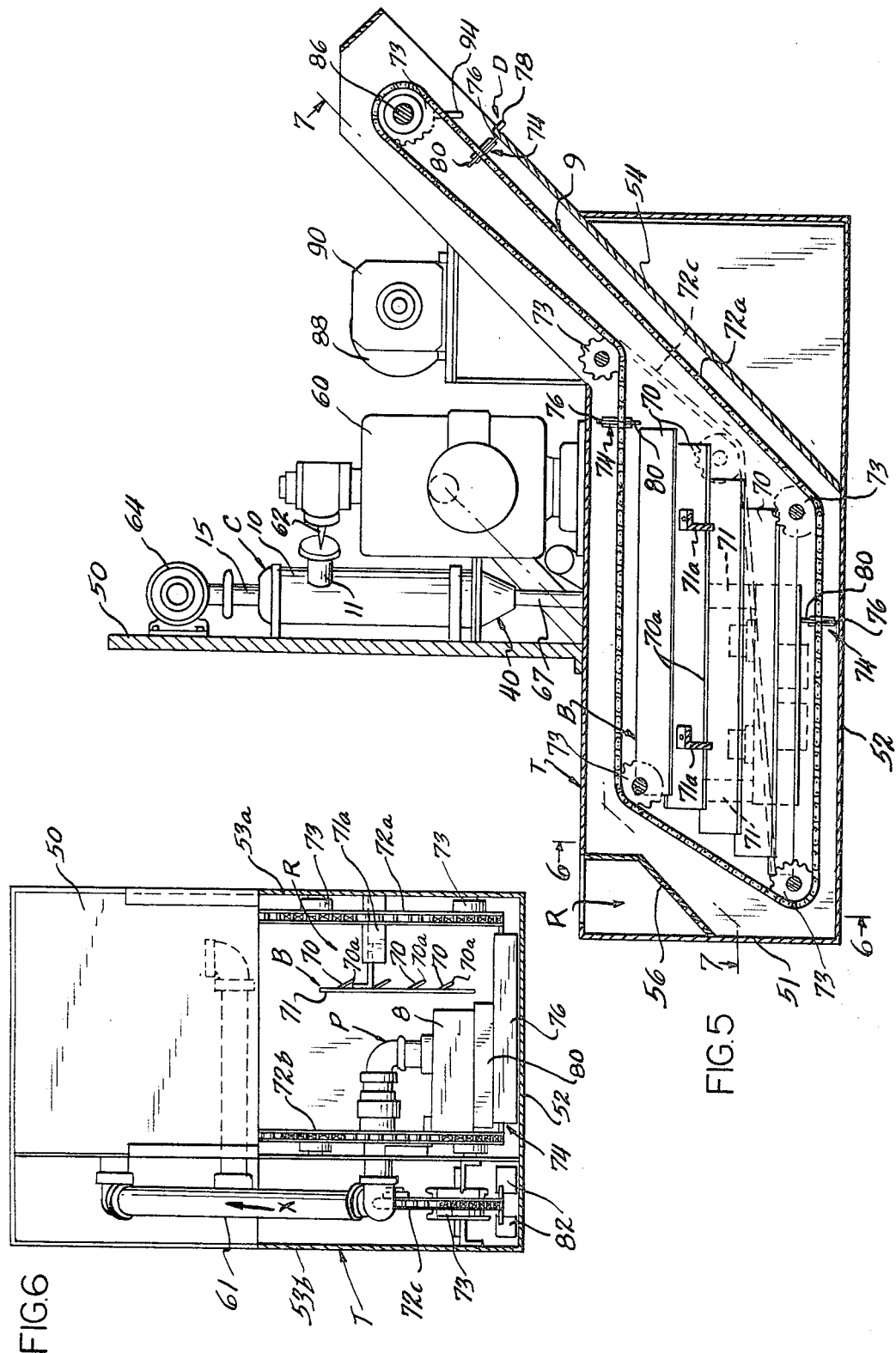

United States Patent Office 3,433,361
Patented Mar. 18, 1969

3,433,361
COOLANT FILTER COMBINATION
Lewis B. Ades, Rockford, Ill., assignor to Sundstrand Corporation, a corporation of Delaware
Continuation-in-part of application Ser. No. 586,750, Oct. 14, 1966. This application May 31, 1967, Ser. No. 642,425
U.S. Cl. 210—258                                  1 Claim
Int. Cl. B01d 25/38, 21/26

ABSTRACT OF THE DISCLOSURE

A coolant filter having a section with a plurality of centrifugal action separator units mounted in a casing having an outlet from the casing for contaminated coolant, a generally conically-shaped member at the outlet with the large diameter end thereof adjacent the separator units to receive contaminants from all of the units and having a small opening at the opposite end from which the contaminants are free to discharge while maintaining a back pressure of coolant within said member, and a gravity separator prefiltering unit exterior of the casing to separate heavy contaminants from the coolant before it enters the casing.

Background of the invention

This is a continuation-in-part of my copending application, Ser. No. 586,750 filed Oct. 14, 1966, relating to coolant filters and, more particularly, to a liquid coolant filter, and now U.S. Patent No. 3,386,588 issued June 4, 1968.

It is known in the art of coolant filters to have units utilizing centrifugal separator units or tubes in which contaminants contained by the coolant are centrifuged through vortex action and with the contaminants leaving the separator units and passing to a container connected to the filter and which must periodically be removed for cleaning after shutting down of the filter unit. This invention is concerned with providing such a centrifugal filter which utilizes coolant underflow for automatically removing contaminants from the filter, with only a small amount of coolant underflow being required, while still maintaining sufficient back pressure within the filter to cause satisfactory operation of the centrifugal separator unit. A generally conical-shaped member is provided to collect the contaminants and some coolant discharged from the centrifugal separators and a restricted outlet is provided in the conical-shaped member to permit continuous underflow from the filtering units.

It has been found that such centrifugal separator units with limited underflow can only operate when heavier contaminant particles, such as large metal chips carried by the coolant away from machine tools, are removed before the coolant enters the casing. This invention includes a gravity separator prefiltering unit comprising a plurality of baffles positioned in a settling tank subjacent the centrifugal coolant filter, coolant being fed from a pickup station in the tank to the coolant filter. The baffles cause the coolant flowing toward the pickup station to flow in an upward direction during a portion of its flow and thereby prevent the passage through the baffles of particles too heavy to be carried upwardly by the coolant.

Summary of the invention

An object of this invention is to provide a coolant filter section which can act continuously and which provides for the use of coolant underflow for automatically removing contaminants from the filter, with only a small amount of coolant underflow being required to remove the contaminants from the filter.

Another object of the invention is to provide a liquid coolant filter in which a casing mounts a plurality of centrifugal separator units for centrifuging contaminants from the flow of coolant and with a generally conical-shaped member at one end of the casing providing for collection of the contaminants and some coolant as discharged from the separator tubes which has a restricted outlet to permit continuous underflow from the filter with removal of the concentrated contaminant solids and while still maintaining sufficient back pressure within the filter to cause satisfactory operation of the centrifugal separator units.

A further object of the invention is to provide a liquid coolant filter as defined in the preceding paragraph wherein the generally conical-shaped member has its larger diameter end adjacent the outlets of the centrifugal separator tubes so as to collect contaminants from all of said tube units and with the opposite end of said member having the restricted outlet for underflow and with a wear member positioned within the generally conical member for take up of the wear resulting from the contaminant flow and being easily replaceable to prolong the life of the coolant filter.

Yet another object of the invention is to provide a gravity separator prefiltering unit for removing heavy contaminant particles from the coolant before the coolant is fed to the centrifugal coolant filter section to enable the filter to operate with small amounts of contaminated coolant discharged through the restricted outlet.

Still a further object of the invention is to provide a coolant filter having a prefiltering unit for the centrifugal filter where in a settling tank has a coolant receiving station, a coolant pickup station comprising a suction box horizontally spaced from the receiving station, and a gravity separator between the receiving station and the suction box, the gravity separator having a plurality of horizontal baffles spaced in a generally vertical plane transverse to the flow of coolant from the receiving station to the pickup station, each baffle overlapping its subjacent baffle on the side thereof nearest the receiving station to cause coolant to flow in an upward direction as it passes through the baffles thereby preventing the passage through the baffles of contaminants too heavy to be carried upwardly by the coolant.

A further object of this invention is to provide a prefiltering unit as defined in the preceding paragraph wherein the tank is provided with a contaminant dumping station, the pickup suction box having a horizontal open bottom spaced from the bottom of the tank and covered by a filtering element, and a conveyor having a plurality of scraper blades movable in a path along the bottom of the tank from the receiving station beneath the suction box to the dumping station with the scraper blades disposed to scrape settled contaminants from the bottom wall of the tank and also to scrape contaminants from the filtering element covering the open bottom of the suction box.

Still another object of this invention is to provide a prefiltering unit as defined in the preceding paragraph including a wiper plate extending into the path of movement of the scraper blades and mounted for pivotal movement perpendicular to the movement of the scraper blades to successively engage and pivotally move across the blades as the blades are moved by the conveyor to strip contaminants from the blades as they pass the wiper plate.

Description of the drawings

FIG. 4 is a top plan view, on a reduced scale, of a prefiltering unit embodying the invention, with the centrifugal coolant filter mounted thereon;

FIG. 5 is a section, taken generally along the line 5—5 of FIG. 4;

FIG. 6 is a section, taken generally along the line 6—6 of FIG. 5;

FIG. 7 is a section, taken generally along the line 7—7 of FIG. 5; and

FIG. 8 is a partial section, on an enlarged scale, taken generally along the line 8—8 of FIG. 4.

*Detailed description of the invention*

Initially referring to FIGS. 5 through 7, the invention generally comprises a prefiltering settling tank T which has a coolant receiving station R, a coolant pickup station P, and a contaminant dumping station D (FIG. 5). A gravity separator means in the form of a baffle panel B is disposed between the receiving station and the pick-up station to prevent coolant from carrying heavy contaminants from the receiving station to the pickup station, as will be more fully described below. Coolant enters the tank at the receiving station R, flows through the baffle panel B to the pickup station P, and is drawn from the settling tank by means of a suction box 8 at the pickup station whereupon the coolant is fed to a coolant filter section C of the centrifugal separator type. The centrifugal separator C filters the coolant and returns the contaminants back to the settling tank T where the contaminants, along with the heavy contaminant particles separated by baffle panel B, are dragged from the tank by means of a conveyor "drag out" assembly generally designated 9 (FIG. 5).

Figure 1:
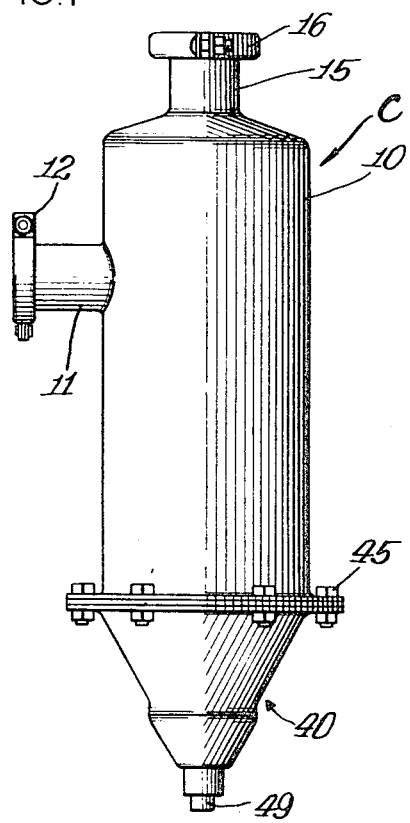
FIG. 1 is an elevation view of a centrifugal coolant filter section embodying the invention.
Figure 2:
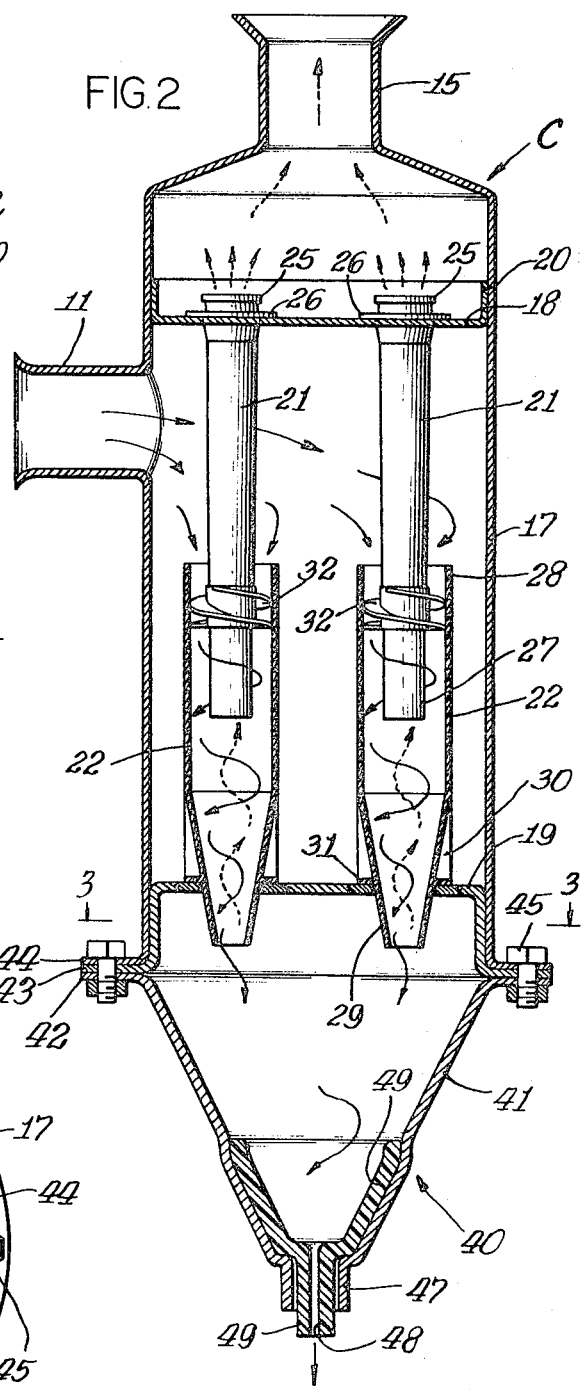
FIG. 2 is a central vertical section, on an enlarged scale, of the coolant filter of FIG. 1.
Figure 3:
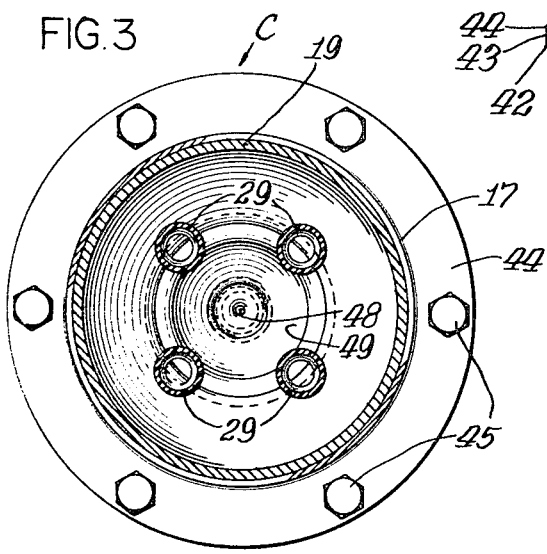
FIG. 3 is a section, taken generally along the line 3—3 of FIG. 2.

Referring particularly to FIGS. 1 through 3, the casing 10 of the coolant filter C has an inlet port 11 extending from a side thereof provided with a coupling member 12 for receiving coolant having contaminants carried therein. One use of the filter is with coolant from machine tools such as grinders. The filter separates the solid contaminants from the coolant, with the overflow or clean coolant leaving the casing through a port 15 at the top of the casing and which has a coupling member 16 associated therewith. The casing is generally cylindrical, with a wall 17 from which the inlet port 11 extends. A pair of transverse partitions 18 and 19 are positioned in spaced-apart relation within the casing 10, with the first partition 18 having a flange 20 which can be secured, as by welding, to the wall 17 of the casing. The inlet port communicates with the interior of the casing between the partitions 18 and 19, while the outlet port 15 is at the opposite side of the first partition 18.

The partitions 18 and 19 mount a plurality of centrifugal separator tubes or units, each of which are of the same construction and each of which embody an inner tube 21 and an outer tube 22 having an annular space therebetween along their overlapping lengths. Technically, the contaminants are removed by a separating action so that the unit described could be referred to as a "separator," instead of as a "filter" as used herein, although the latter name is commonly used. The inner tube 21 has an end 25 positioned to one side of the partition 18, with a flange 26 engageable against the partition and an opposite end 27 positioned within the outer tube 22. A first end 28 of the outer tube surrounds the inner tube 21 and is located in the hollow casing in the space between the partitions 18 and 19 to receive contaminated coolant entering through inlet port 11. The opposite end 29 of the outer tube converges, as shown in FIG. 2, and extends through and beyond the partition 19 into a collecting chamber for contaminants. The separator units are suitably formed of plastic, metals or ceramics, with the outer tube having strengthening ribs 30 terminating in a continuous flange 31 which rests against the top of the lower partition 19. A helical vane 32 is mounted on a reduced portion of the inner tube 21 and positioned within the outer tube 22 to induce a vortex in the rapidly flowing coolant, as the coolant flows downwardly in the outer tube 22, whereby contaminant particles are centrifuged out against the inner wall of the outer tube 22 and with the assistance of gravity caused to move down along the inner wall of the outer tube 22 and through the converging end of the outer tube into a collecting chamber. This flow of coolant is shown by the arrows in solid line in FIG. 2. Clean coolant is reversed at the bottom of the converging end of the outer tube 22 and returns in an inner vortex through the inner tube 21 to travel past the partition 18 and flow out the overflow outlet 15.

The foregoing structure is known in the art. I have provided with this known structure means for rendering the coolant filter fully automatic in use, with a continuous underflow of a small amount of coolant from the filter carrying with it the concentrated contaminant solids, with the structure providing for a back pressure within the filter which is required to have the seperator tubes operate properly by causing reversal of the clean coolant to travel along the inner tube 21.

This structure embodies a hollow, generally conical adapter member, indicated generally at 40, having a wall 41 which, at its large diameter end, has an outwardly-turned flange 42 which matches an outwardly-turned flange 43 of the partition plate 19 and an outwardly-turned flange 44 of the casing wall 17. These three components are held in assembled relation by a series of threaded connections, such as the nut and bolt structure 45, shown in the drawings. The conical adapter member 40, at its large diameter end, is of a size to span the outlets of all the separator units to collect the contaminants and some coolant flowing out of the separator units and has a restricted outlet end for continuous underflow from the filter, with this limited flow resulting in sufficient back pressure within the collecting chamber defined by the adapter member. The conical member 40 has an outlet end 47 and the outlet opening is provided by a passage 48 in a wear member 49 of plastic (or metal or ceramic) which is made of a shape to matingly engage the interior surface of the coned adapter and which is replaceable so that wear caused by the flow of contaminants will be taken up by the wear member and the member can be replaced when desired or necessary.

With the structure as described herein, a small continuous amount of underflow from the filter carries off the solid contaminants as distinct from prior constructions, as known in the art, wherein a collecting device, such as a bottle, is placed at the lower end of the filter. With the restricted outlet, as provided by a sufficiently small opening of the outlet 48, the underflow can be continuous without taking a substantial amount of coolant from the system and, further, the underflow can be continuous while still not destroying the back pressure required within the filter to insure operation of the separator units.

As an example, in a unit handling 30 gallons per minute, there can be two separator tubes (or 150 gallons per minute there can be ten separator tubes) and the conical member 40 has an outlet opening diameter of from $\frac{1}{16}''$ to $\frac{1}{4}''$.

Referring to FIGS. 4 through 7, the centrifugal coolant filter section C is secured to a mounting wall 50 above the settling tank T of the prefiltering unit. The settling tank is generally rectangular and has a vertical front wall 51, a flat bottom wall 52, vertical side walls 53a, 53b, and an inclined rear wall 54 forming a tub-like structure into which dirty coolant is fed from a machine tool, prefiltered, and fed to the centrifugal coolant filter C. The receiving station R includes an elongated trough 56 disposed inside the tank T at the top of front wall 51 and into which the contaminated coolant is fed from a machine tool. An opening 57 is located at one end of the trough adjacent side wall 53a and is covered by an expanded metal screen 58 through which the contaminated coolant flows into the settling tank toward the pickup station P and suction box 8. A pump 60 (FIGS. 4 and 5) draws the coolant from suction box 8 and through a pipe 61, in the direction of arrow X (FIGS. 4 and 6), into the pump and out through a pipe 62 into the inlet 11 of the centrifugal coolant filter C.

Clean coolant leaves the coolant filter through outlet port 15 (FIG. 5), through a heat exchanger 64, to a supply pipe 65 (FIG. 4) where the now clean coolant is cooled to be ready for use with machine tools. Contaminants and a small amount of coolant are discharged from the coolant filter section C through a discharge pipe or hose 67 (FIG. 5) into an underflow discharge portion 68 (FIG. 7) of settling tank T. The underflow tank portion 68 is formed by a partition 69 extending longitudinally of the tank T to segregate the underflow settling portion of the tank from the remainder thereof. The pipe 67 allows the filter discharge coolant to enter tank portion 68 below the coolant level to minimize turbulence and prevent foaming, thereby improving the settling of contaminants to the bottom of the tank.

In order to prevent the passage of heavy contaminant particles from the receiving station R to the pickup station P and the suction box 8, a gravity separator in the form of baffle panel B is provided. The panel comprises a plurality of horizontally elongated baffles 70 (FIGS. 5 and 6) secured to a pair of vertical mounting bars 71 which are fixed to the tank side wall 53 by horizontal brackets 71a. The baffles 70 are spaced in a generally vertical plane generally transverse to the flow of coolant from the receiving station R to the suction box 8, in the direction of arrow Y (FIG. 7). As best illustrated in FIGS. 5 and 6, each baffle has a lower horizontal portion 70a overlapping the upper horizontal portion of the immediate subjacent baffle on the side of the baffle panel B nearest the receiving station R to cause coolant to flow upwardly as it passes through the baffles thereby preventing the passage through the baffle panel of contaminant particles too heavy to be carried upwardly by the coolant. In operation, the heavy particles will either directly settle by gravity to the bottom of the settling tank on the right of baffle panel B in FIG. 6, or strike the overlapped portions of the individual baffles and settle through the coolant to the bottom of the tank whereupon they will be dragged therefrom, as will be more fully described below. In other words because of the weight of the larger contaminant particles, the particles will settle to the bottom of the tank rather than flow upwardly through the baffles toward suction box 8. Obviously, the weight of those particles which will not be drawn upwardly by the coolant through the baffles will depend on the specific gravity of the coolant and the buoyancy of the particles.

By prefiltering the coolant the contaminant particle sizes are sufficiently small to flow through the restricted passage 48 of the centrifugal coolant filter C. Without the prefiltering the contaminant particles could be quite large and opening 48 in filter section C would have to be so large as to cause a high rate of underflow.

Not only do the baffles prevent pasage of heavier contaminant particles therethrough, but the baffles cut down on the turbulence formed by the flow of coolant in the tank T and therefore facilitate the settling of the contaminants to the bottom of the tank.

In order to remove the contaminants which have settled to the bottom of the tank, a "drag out" assembly is provided in the form of a driven conveyor, as best illustrated in FIGS. 5 through 7. The conveyor comprises three "drag out" chains 72a, 72b and 72c (FIGS. 6 and 7) which follow paths defined by sprockets 773, as best illustrated in FIG. 5. Chains 72a, 72b have a plurality of generally parallel, horizontal flight assemblies, indicated generally as 74, extending between the chains and spaced longitudinally thereon for removing the contaminants which have settled in the tank on the coolant receiving and pickup side of partition 69. Each flight assembly 74 includes a scraper blade 76 which moves in a path along the bottom wall 52 of the tank from the receiving station R (below trough 56), beneath the suction box 8, to the dumping station D at the top of the inclined rear wall 54 of the tank where the contaminants fall by gravity through an opening 77 defined by lip 78 at the top of the rear wall 54. An appropriate receptacle can be positioned below lip 78 to catch contaminant particles falling therefrom. It should be noted that the rear wall 54 of the tank rises above the normal level of coolant in the tank to reduce the amount of coolant which is dragged along by the scraper blade toward opening 77.

Suction box 8 has a generally horizontal open bottom which is covered by a flat filtering element, such as a filtering screen, and, as seen in FIG. 6, the open bottom of the suction box is spaced from the bottom wall 52 of the tank. Each flight assembly 74 has a second scraper blade 80 above scraper blade 76. The upper horizontal edge of blade 80 is disposed to scrape contaminants from the flat filtering screen covering the open bottom of the suction box. In the embodiment illustrated, the scraper blades 76 and 80 are shown to be individual members held by the flight asembly 74. However, a single scraper blade may be formed to perform both functions of scraping settled contaminants from the bottom wall 52 of the tank and also to scrape contaminants from the flat filtering element covering the open bottom of the suction tank.

Drag out chain 72c, disposed in the underflow portion 68 of the settling tank also has a plurality of scraper blades 82 spaced along the chain to scrape the settled contaminants from the bottom wall of the underflow tank portion 68 and remove the contaminants in the manner as described above for scraper blade 76 on the opposite side of the tank partition 69.

All three of the drag chains 72a, 72b and 72c are driven from a common shaft 86 (FIGS. 5 and 7) which is driven by a motor 88 which operates through a speed reducer 90 and drive chain 92 (FIG. 4) to rotate drive shaft 86.

Referring to FIG. 5, a wiper plate 94 extends longitudinally along drive shaft 86 between drag out chains 72a, 72b in the path of movement of the flight assembly 74 as the scraper blades 76 and 80 pass the dumping station D. The wiper plate is journalled by means of bushings 96 (FIG. 7) about the drive shaft 86 for pivotal movement independently of the rotation of the drive shaft. The wiper plate 94 hangs by gravity into the path of movement of the flight assemblies 74 and the scraper blades 76, 80 to successively engage and pivotally move across the blades as the blades are moved by chains 72a, 72b to wipe contaminants therefrom and cause any contaminants that may be lodged on the scraper blades to fall from the dumping station D through opening 77.

Referring to FIG. 8, an opening 98 is provided at the top edge of partition 69 adjacent the coolant receiving trough 56 for the overflow of coolant from the underflow tank portion 68 back to the main settling tank to the right of partition 69. Since the underflow settling tank portion 68 receives the dirty coolant discharged from the centrifugal coolant unit C, a film 100 builds up on the top surface of the dirty coolant. In order to permit the overflow of coolant through opening 98 and at the same time prevent the passage of the film back to the main settling tank, a dam or "weir" is provided comprising vertical walls 102a and 102b which, in cooperation with the receiving trough 56 block the passage of film through opening 98 while permitting the passage of coolant in the direction of arrow Z.

I claim:
1. A coolant filter for contaminated coolant having both large and small particles including a centrifugal separator unit having a casing, an inlet to said casing for contaminated coolant, an outlet from said casing for clean coolant, an outlet from said casing for underflow coolant with concentrated contaminants consisting of relatively light and small particles, said latter outlet having a restricted passage to restrict the rate of underflow and only of a size to pass relatively small particles, a prefiltering unit for separating relatively large contaminant particles from said coolant before the coolant enters said casing to enable reduction in the size of the restricted passage by reducing the size of the contaminant particles which are to pass therethrough, said prefiltering unit comprising a tank adjacent said casing, said tank having a coolant receiving and pickup portion and an underflow receiving portion with a divider partition therebetween, said underflow receiving portion being positioned to receive the contaminants and coolant discharged through said restricted passage and being provided to separate the small particle contaminants from the coolant by settling action, means for periodically removing small particle contaminants from the underflow receiving portion to avoid a super-saturated condition of the coolant, an opening through said partition adjacent the top thereof for the flow of coolant from the underflow receiving portion of said tank back into the coolant receiving and pickup portion of said tank, passage means for said contaminated coolant from the receiving and pickup portion of said tank to said casing inlet including a suction box located in the receiving and pickup portion of said tank with an inlet covered by a screen to separate said relatively large contaminants from said coolant before the coolant enters said passage means, a pump for drawing fluid through said screen into said passage means, and means for periodically wiping the fluid entering side of the screen to remove large particles held thereon by pump created suction and thus avoid clogging of the screen.

References Cited

UNITED STATES PATENTS

| | | | |
|---|---|---|---|
| 1,775,233 | 9/1930 | Brakensiek | 210—84 X |
| 2,378,632 | 6/1945 | Hooker et al. | 210—512 |
| 2,861,688 | 11/1958 | Harms | 210—298 X |
| 2,865,509 | 12/1958 | Harlan | 210—526 X |
| 2,954,871 | 10/1960 | Lummus et al. | 209—211 |
| 2,999,597 | 9/1961 | Harms | 210—521 X |
| 3,057,476 | 10/1962 | Gilbert | 209—211 |
| 3,261,467 | 7/1966 | Wikdahl | 309—211 |
| 3,289,775 | 12/1966 | Stone | 209—211 X |

REUBEN FRIEDMAN, *Primary Examiner.*

J. L. DE CESARE, *Assistant Examiner.*

U.S. Cl. X.R.

210—298, 413, 512, 526